United States Patent [19]
Arai

[11] Patent Number: 5,559,604
[45] Date of Patent: Sep. 24, 1996

[54] COLOR MATCHING APPARATUS FOR REPRODUCING THE SAME COLOR UNDER DIFFERENT ILLUMINANTS

[75] Inventor: Yoshifumi Arai, Tokyo, Japan

[73] Assignee: Toyo Ink Manufacturing Co., Ltd., Tokyo, Japan

[21] Appl. No.: 313,470

[22] Filed: Sep. 27, 1994

[30] Foreign Application Priority Data

Sep. 27, 1993 [JP] Japan .................................. 5-239578
Sep. 27, 1993 [JP] Japan .................................. 5-239579
Sep. 27, 1993 [JP] Japan .................................. 5-239580

[51] Int. Cl.$^6$ ................................................. G01N 21/27
[52] U.S. Cl. ................................................. 356/402
[58] Field of Search ................................. 356/402, 419

[56] References Cited

U.S. PATENT DOCUMENTS

| | | | |
|---|---|---|---|
| 4,275,413 | 6/1981 | Sakamoto et al. . | |
| 5,175,697 | 12/1992 | Kawagoe et al. | 356/419 X |
| 5,185,850 | 2/1993 | Usui et al. | 395/22 |

FOREIGN PATENT DOCUMENTS

| | | |
|---|---|---|
| 4-261267 | 9/1992 | Japan . |
| 5-336363 | 12/1993 | Japan . |
| 5-347703 | 12/1993 | Japan . |

OTHER PUBLICATIONS

Coppock et al. "Color Technology and its Applications in Industry" Published Feb. 1970 by Diano Corporation.
Arai et al.; "A Method of Transformation from CIE Lab to CMY Value by a Three–Layered Neural Network"; IS&T and SID's Color Imaging Conference: Transforms & Transportability of Color; 1993, vol. J76–D–II, No. 5, pp. 967–975 (original Japanese version).
Arai et al.; "A Method of Transformation fro CIE Lab to CMY Value by a Three–Layered Neural Network"; IS&T and SID's Color Imaging Conference: Transforms & Transportability of Color; 1993, pp. 41–44 (Eng. translation with slight variations from the original Japanese version.

*Primary Examiner*—Vincent P. McGraw
*Attorney, Agent, or Firm*—Knobbe, Martens Olson & Bear

[57] ABSTRACT

Colorimetric values such as L*a*b* values are transformed into color separation values such as CMYK values dependent on the characteristics of a color output device by using a multilayered feedforward neural network. The neural network learns in advance the relationships between a multiplicity of colorimetric values under different illuminants and color separation values. When colorimetric values of a standard illuminant and one of the color temperature of an observational illuminant, the spectral distribution of the observational illuminant, and colorimetric values at the time of illumination by the observational illuminant are inputted to the neural network, color separation values corresponding to one of the color temperature of the observational illuminant, the spectral distribution of the observational illuminant, and the colorimetric values obtained when illumination is provided by the observational illuminant are outputted. Consequently, colorimetric values are transformed into color separation values such that the color reproduced under the observational illuminant will visually assume the same color as that under the standard illuminant.

16 Claims, 3 Drawing Sheets

COLOR MATCHING APPARATUS FOR REPRODUCING THE SAME COLOR UNDER DIFFERENT ILLUMINANTS

BACKGROUND OF THE INVENTION

1. Field of the Invention

The present invention relates to a color matching apparatus, and more particularly to an apparatus for color matching under a different illuminant for affecting color correction such that a reproduced color will appear to be the same when the reproduced color is observed under a different illuminant, by color-transforming differences in the appearance of the color reproduced by a color output device, i.e., a color reproducing device, due to the effect of an illuminating illuminant during observation into color separation values corresponding to the illuminating illuminant during observation, when colorimetric values are transformed into color separation values dependent on the difference in a mechanism of the color output device and chemical and optical properties of a colorant.

2. Description of the Related Art

With respect to colors of conventional printed matter and the like, it has been the general concept of color matching to evaluate the color under a standard illuminant or the like which serves as a reference, such as D50 or D65 prescribed by CIE (Commission Internationale de l'Eclairage), and to reproduce an accurate color under that illuminant. For this reason, there has not been much need to effect color matching under an observational illuminant other than the standard illuminant. Consequently, practically no existing techniques have been developed concerning methods and apparatuses for color matching under such different illuminants.

However, color-printed matter has come to be used for various uses due to the development in recent years of desktop publishing (DTP) and simplified color printers, and lighting conditions for observing the printed matter have also become varied. For this reason, apart from the mere requirement that the color matches under a predetermined illuminant such as a standard illuminant, there has arisen a need to accurately reproduce the color under an arbitrary illuminant.

SUMMARY OF THE INVENTION

The present invention has been devised in view of the above-described need, and it is an object of the present invention to provide a color matching apparatus which is capable of accurately reproducing the color under an arbitrary illuminant, i.e., under not only a standard illuminant but also a different illuminant other than the standard illuminant.

To attain the above object, in accordance with a first aspect of the present invention, there is provided a color matching apparatus for effecting color matching by transforming colorimetric values into color separation values dependent on the difference in a mechanism of a color output device for effecting color reproduction and chemical and optical properties of a colorant, comprising: a spectralphotometer for detecting a color temperature of an observational illuminant for observing a reproduced color; and transforming means for transforming colorimetric values into color separation values on the basis of the colorimetric values under a predetermined illuminant and the color temperature detected by the spectralphotometer, such that the color reproduced under the observational illuminant visually presents the same color as obtained when the same color as that under the predetermined illuminant is observed under the observational illuminant.

A multilayered feedforward neural network is used as the transforming means.

In addition, as the predetermined illuminant, it is possible to use a standard illuminant of a D illuminant having a color temperature of 4000 [K] to 20000 [K].

In accordance with the first aspect of the present invention, the spectralphotometer and the transforming means for transforming colorimetric values into color separation values are provided. Since the colorimetric values such as XYZ values, L*a*b* values, and L*u*v* values are dependent on the types of illuminating light during measurement, the colorimetric values measured under different illuminants possess different values. For this reason, the pairs of colorimetric values and color separation values dependent on the characteristics of the color output devices, such as R, G, and B values, C, M, and Y values, or C, M, Y, and K values, differ for each illuminant. The color converting means in the present invention is constituted by, for instance, a multilayered feedforward neural network which is adjusted such that the color transformation processing for transforming colorimetric values into color separation values can be effected accurately when the color temperatures of all the illuminants, which are estimated as illumination at the time of observation, are inputted in advance, including a predetermined illuminant such as a standard illuminant, an A illuminant, a B illuminant, a C illuminant, and fluorescent-lamp illuminants such as F1 to F12. As the color temperature of the observational illuminant is detected by the spectralphotometer, and the color separation values transformed by the transforming means are transmitted to the color output device, color matching is effected such that, when the reproduced color is observed under an illuminant other than a predetermined illuminant such as D50 or D65, the reproduced color appears to be the same color as the one obtained when the same color as that observed under the predetermined illuminant is observed under the observational illuminant.

In accordance with a second aspect of the present invention, instead of the color temperature in accordance with the first aspect of the present invention, a spectral distribution of an observational illuminant is detected by a spectralphotometer, and colorimetric values are transformed into color separation values by the transforming means on the basis of the colorimetric values under a predetermined illuminant and the spectral distribution detected by the spectralphotometer, such that the color reproduced under the observational illuminant visually presents the same color as obtained when the same color as that under the predetermined illuminant is observed under the observational illuminant.

In addition, in accordance with a third aspect of the present invention, instead of the color temperature in accordance with the first aspect of the present invention, colorimetric values are detected by colorimetrically measuring a color chip illuminated by an observational illuminant by using a spectralphotometer for detecting colorimetric values. Colorimetric values are transformed into color separation values by the transforming means on the basis of the colorimetric values under a predetermined illuminant and the detected colorimetric values, such that the color reproduced under the observational illuminant visually presents the same color as obtained when the same color as that under the predetermined illuminant is observed under the observational illuminant.

As described above, in accordance with the present invention, colorimetric values are transformed into color separation values to obtain such color separation values that, when the color is observed under a different illuminant, the reproduced color will appear to be the same color as the one obtained when the same color as the one observed under a predetermined illuminant is observed under an observational illuminant, by using an apparatus for correcting the color such that the appearance of the color reproduced under a different illumination and the appearance of the color obtained when the same color as that observed under the predetermined illuminant is observed under the observational illuminant will always match. At this time, the color converting means which has learned in advance converts colorimetric values into color separation values of the color output device, such as R, G, and B, C, M, and Y, or C, M, Y, and K values corresponding to various illuminants, on the basis of respective colorimetric values, such as sets of XYZ values and L*a*b* values under a predetermined illuminant and an illuminating illuminant during observation. Accordingly, it is possible to correct the reproduced color such that the reproduced color will visually present the same color as the one obtained when the same color as that observed under the predetermined illuminant is observed under the observational illuminant.

DESCRIPTION OF THE PREFERRED EMBODIMENTS

Figure 1:
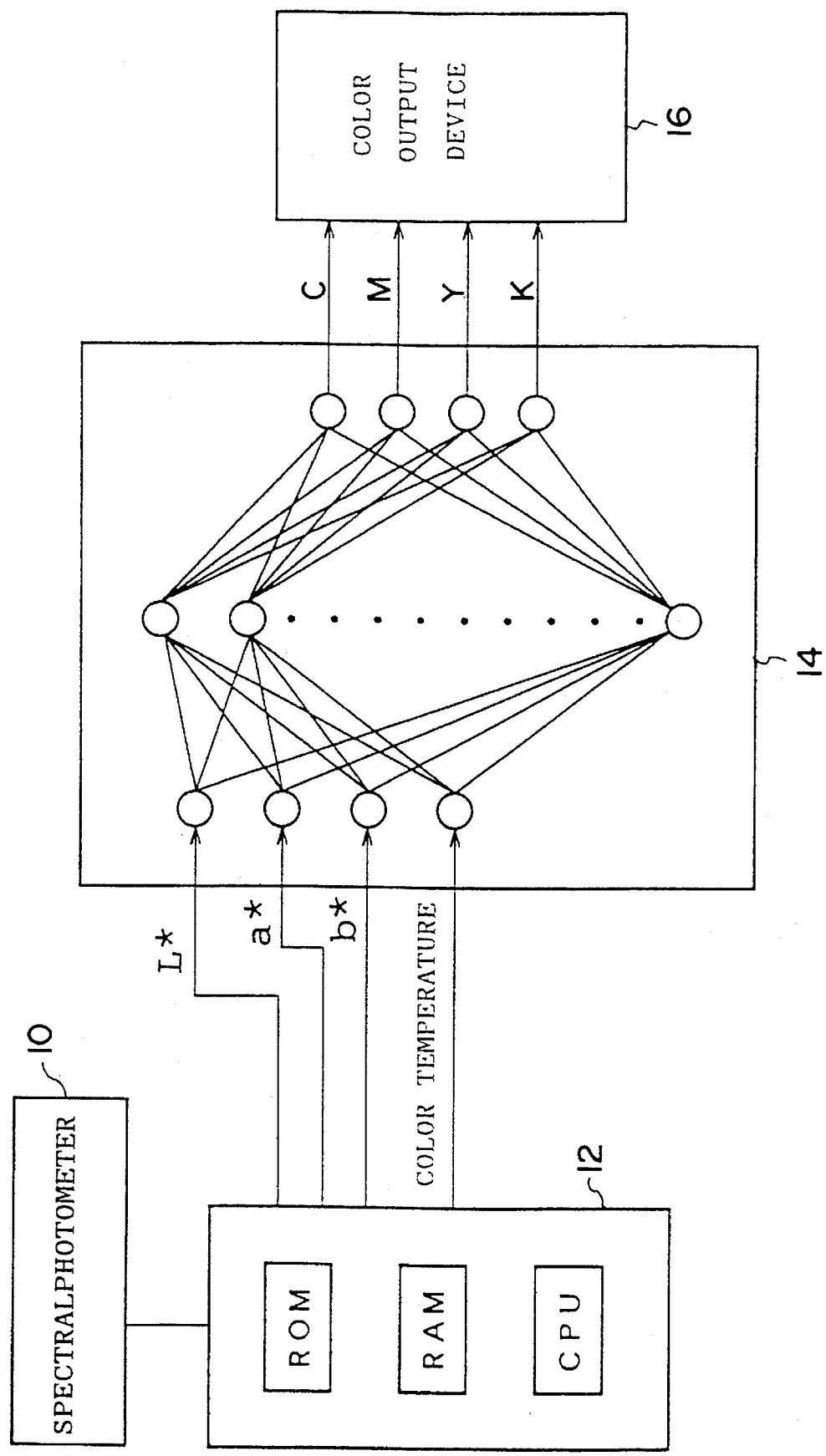
FIG. 1 is a schematic diagram illustrating a first embodiment of a color matching apparatus in accordance with the present invention.

FIG. 1 shows a schematic diagram of a first embodiment of an apparatus for color matching under a different illuminant, in which the difference in the vision of a color due to the effect of an illuminating light during observation is corrected., and in a case where a reproduced color is observed under an illuminant other than a predetermined illuminant, such as a D50 illuminant or a D65 illuminant prescribed by CIE as a standard illuminant, the reproduced color is made to visually present the same color as the one obtained when the same color as that observed under the predetermined illuminant is observed under an observational illuminant. In this embodiment, a multilayered feedforward neural network is used as a color transforming means.

In this embodiment, a spectralphotometer 10 is provided for detecting the color temperature of an observational illuminant for observing a color reproduced on a print outputted from a color output device or on a CRT screen, as shown in FIG. 1. The spectralphotometer 10 is connected to an input terminal of a computer 12. The computer 12 is comprised of a ROM, a RAM, a CPU, and buses for connecting them. A value of a lightness index L* and values of chromaticness indices a*, b* in an L*a*b* colorimetric system, which are colorimetric values when an observation is made under a standard illuminant such as D50 or D65, are loaded in the RAM from an external storage device.

The computer 12 is connected to a multilayered feedforward neural network 14. The neural network 14 is comprised of an input layer having four units, an intermediate layer having a multiplicity of units, and an output layer having four units.

The neural network 14 is connected to the computer 12 such that the L*, a* and b* values under a standard illuminant which are stored in the RAM and the color temperature detected by the spectralphotometer 10 are inputted to the respective units of the input layer. Meanwhile, C, M, Y, and K values, which are color separation values, are outputted from the respective units of the output layer. The output layer of the neural network 14 is connected to a color output device 16 such as a color printer.

The neural network 14 used as the color transforming means employs an existing color-transforming technique for transforming L*a*b* values to CMY values, as described in Japanese Patent Unexamined Publication No. 261267/1992 or in "A Method for Transformation from CIE L*a*b* Value to CMY Value by a Three-Layered Neural Network" (IS & T/SID Color Imaging Conference Transforms & Transportability of Color (Arizona), Nov. 7–11, 1993, pp. 41–44).

The neural network 14 is made in advance to learn a multiplicity of (e.g., 200) color temperatures as well as the relationships between the L*, a* and b* values at each color temperature transformed by the aforementioned color-transforming technique on the one hand, and the CMYK values on the other. Namely, the color temperatures and the relationships are learned in advance so that CMYK values with respect to the inputted color temperature will be outputted from the output layer when the L*, a* and b* values under a standard illuminant and an observational illuminant, i.e., the color temperature of an illuminating illuminant, are inputted to the input layer. If a set of colorimetric values and color separation values dependent on the characteristics of the color output device is present for each color temperature, it is possible to effect accurate color transformation by means of the learning function of the neural network. Incidentally, as the aforementioned color temperature, it is possible to use the color temperatures of all the illuminants which are estimated as illumination at the time of observation, including a predetermined illuminant such as a standard illuminant, an A illuminant, a B illuminant, a C illuminant, and fluorescent-lamp illuminants such as F1 to F12.

In accordance with this embodiment, when the color temperature of the observational illuminant is detected by the spectralphotometer 10, the L*, a* and b* values under a standard illuminant and the color temperature detected by the spectralphotometer 10 are inputted to the respective units of the input layer of the neural network 14. As a result, CMYK values corresponding to the detected color temperature is outputted from the output layer. The CMYK values are inputted to the color output device 16 to effect color reproduction. At this time, the colorimetric values are transformed into color separation values such that the reproduced color under the detected observational illuminant will visually present the same color as obtained when the same color as that under the standard illuminant is illuminated by the observational illuminant.

Figure 2:
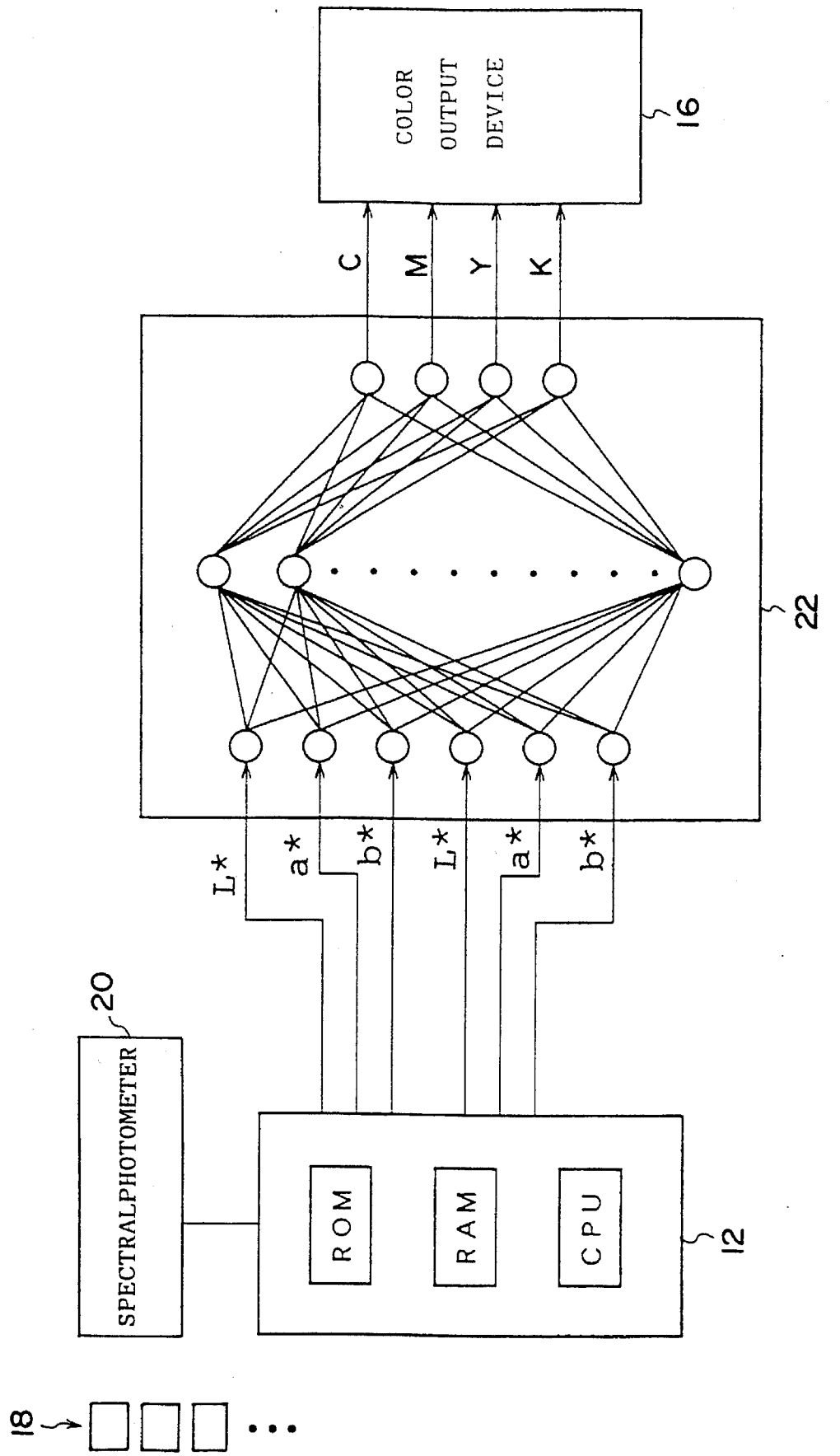
FIG. 2 is a schematic diagram illustrating a second embodiment of a color matching apparatus in accordance with the present invention.

Referring now to FIG. 2, a description will be given of a second embodiment of the present invention. In this embodiment, a spectralphotometer 20 measures the L*a*b* values of individual color of color chips 18 having a multiplicity of colors (.e.g., 200 colors or thereabouts) instead of the color temperature of the first embodiment. In addition, instead of the neural network 14 of the first embodiment, a multilayered feedforward neural network 22 having an input layer comprised of six units is used. Since the other arrangements are similar to those of the first embodiment, a description thereof will be omitted.

In this embodiment, the L*a*b* values of each color chip corresponding to the respective illuminants are determined by using the spectral distributions of all the illuminants which are estimated as observational illumination, including a predetermined illuminant such as a standard illuminant, the A illuminant, the B illuminant, the C illuminant, and fluorescent-lamp illuminants such as F1 to F12 which are stored in the computer 12. At the same time, the relationships between the L*a*b* values and the CMYK values for the respective illuminants are determined by using a method described in Japanese Patent Unexamined Publication No. 261267/1992 and in "A Method for Transformation from CIE L*a*b* Value to CMY Value by a Three-Layered Neural Network" (IS & T/SID Color Imaging Conference Transforms & Transportability of Color (Arizona), Nov. 7–11, 1993, pp. 41–44). These relationships are learned in advance by the neural network.

In this embodiment, the color chips 18 are illuminated by the observational illuminant, and the L*a*b* values of each color of the color chips 18 are measure by the spectralphotometer 20. At the same time, the L*, a* and b* values under the standard illuminant and the L*, a* and b* values measured by the spectralphotometer 20 are inputted to the respective units of the input layer of the neural network 14, while the CMYK values corresponding to the colorimetrically measured L*, a* and b* values are outputted from the output layer and are inputted to the color output device 16 as device signals. Consequently, the colorimetric values are transformed into such color separation values as RGB and CMY (K), so that the color reproduced under the illuminant during observation presents the same color as the object color under a standard illuminant such as the D50 or D65 illuminant. Thus, the colorimetric values are transmitted to the color output device as color separation value signals designated at reference numeral 6 to reproduce the color.

Figure 3:
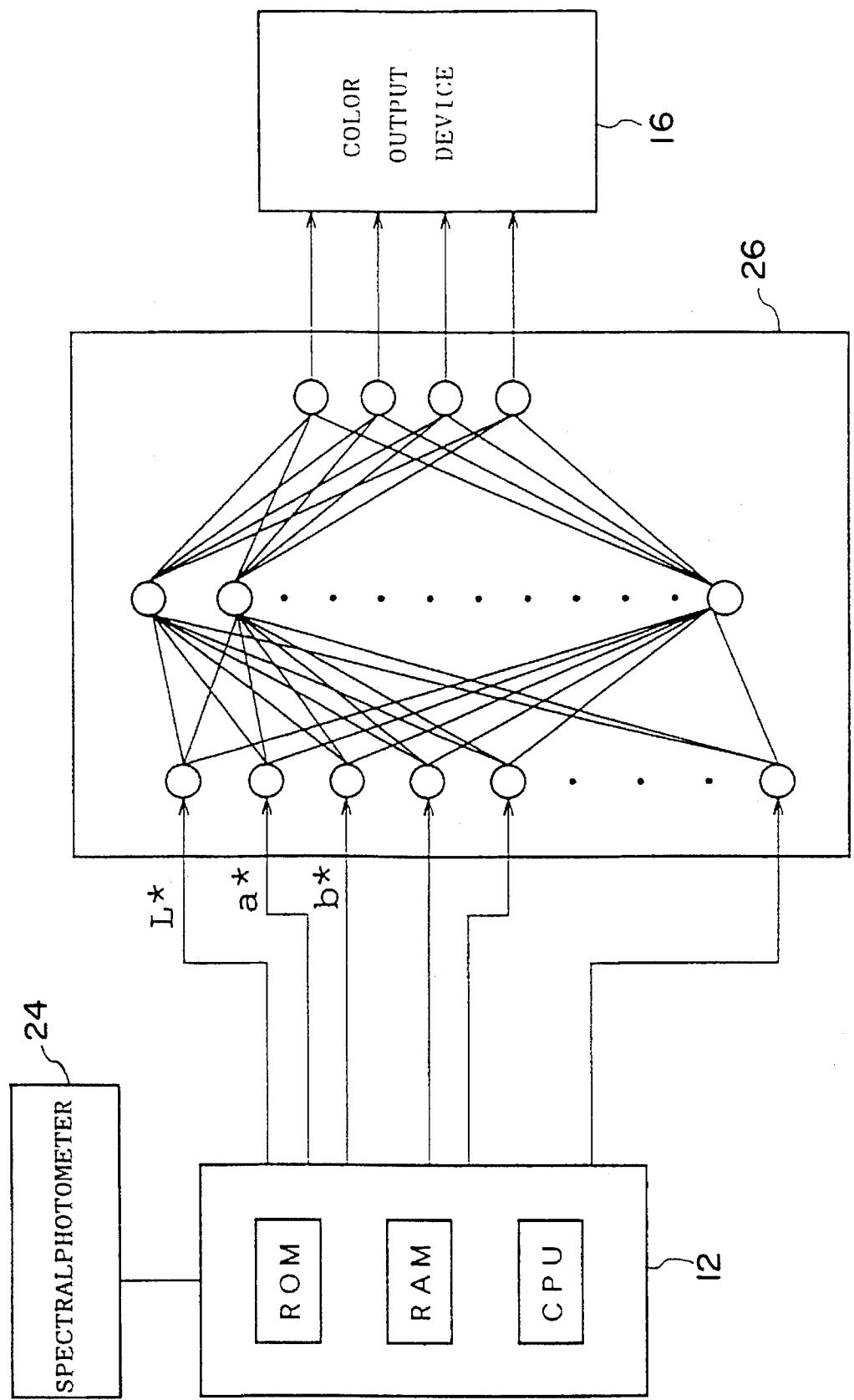
FIG. 3 is a schematic diagram illustrating a third embodiment of a color matching apparatus in accordance with the present invention.

Referring now to FIG. 3, a description will be given of a third embodiment of the present invention. In this embodiment, a spectralphotometer 24 measures the spectral distribution of the observational illuminant instead of the color temperature of the first embodiment. In addition, instead of the neural network 14 of the first embodiment, a multilayered feedforward neural network 26 having an input layer comprised of a multiplicity of (in the embodiment, 19) units is used. Since the other arrangements are similar to those of the first embodiment, a description thereof will be omitted.

The spectralphotometer 24 of this embodiment colorimetrically measures the spectral distribution of the observational illuminant over a wavelength region including a wavelength region of 400 to 700 nm. The computer 12 determines a predetermined number of (e.g., 16) relative responses for each predetermined wavelength (e.g., 20 nm) from 400 nm to 700 nm on the basis of the spectral distribution colorimetrically measured by the spectralphotometer 24. The computer 12 inputs these relative responses to the respective units of the input layer of the neural network 26, and inputs the L*a*b* values under the standard illuminant in the same way as in the foregoing embodiments.

This neural network 26 learns the transformation into CMYK values from a set of a spectral distribution of an observational illuminant and the L*a*b* values under the standard illuminant. Namely, learning is effected in advance such that, when the L*a*b* values under the standard illuminant and a predetermined number of relative responses determined from the spectral distribution are inputted to the input layer, CMYK values corresponding to the inputted set of the spectral distribution of the observational illuminant and the L*a*b* values under the standard illuminant will be outputted from the output layer.

In accordance with this embodiment, when the spectral distribution of the observational illuminant is detected by the spectralphotometer 24, the L* value, the a* value, and the b* value under the standard illuminant, and the predetermined number of relative responses determined from the spectral distribution detected by the spectralphotometer 24 are inputted to the respective units of the input layer of the neural network 26. Then, the CMYK values corresponding to the detected set of the spectral distribution of the observational illuminant and the L*a*b* values under the standard illuminant are outputted from the output layer, so as to effect color reproduction in the same way as described above.

It should be noted that, in the embodiments, the multilayered feedforward neural network may effect learning while detecting the color temperature or the like without learning in advance. In addition, although a description has been given of an example in which the L*, a* and b* values are used as the colorimetric values, it is also possible to use L*, u* and v* values in an L*u*v* colorimetric system or X, Y and Z tristimulus values in an XYZ colorimetric system. Further, although a description has been given of an example in which CMYK values are used as color separation values, it is also possible to use CMY values or RGB values in the case where the color output device is a CRT or the like. Additionally, although a description has been given of an example in which a multilayered feedforward neural network is used, color transformation may be effected by using a look-up table with interpolation which is described in U.S. Pat. No. 4,275,413 or another method storing the relationships between color separation values and a pair of the color temperature of the observational illuminant and colorimetric values, or a pair of the spectral distribution of the observational illuminant and colorimetric values. Still alternatively, color transformation may be effected by using a multiplicity of look-up tables which describe the relationships between color separation values and a pair of colorimetric values persisting when illumination is provided by the observational illuminant and colorimetric values under the standard illuminant.

A color-temperature correcting device such as the one used in the above embodiment was actually configured on Sun Microsystems' Workstation as the color transforming means by using a multilayered feedforward neural network. Color separation values corresponding to an observational illuminant on a color chart were actually determined by using the CLC-500 (manufactured by Canon Inc.; trade name) as the color output device, and were outputted in the cases of D65 and the A illuminant. When the results were visually compared in different light booths having the D65 illuminant and the A illuminant as the illuminants, it was confirmed that the reproduced colors appeared to be the same under the two illuminants.

What is claimed is:

1. A color matching apparatus for reproducing visually the same color under different illuminants, said apparatus comprising:

a spectralphotometer for detecting the color temperature of an observational illuminant; and a transforming means for transforming colorimetric values of a target color under a predetermined first illuminant into color separation values for a reproduced color which under said observational illuminant visually appears the same as said target color under said first illuminant, said transforming means storing the relationship between the colorimetric values of said target color and corresponding color separation values under a plurality of second illuminants having given color temperatures, said corresponding color separation values determined so as to visually reproduce with a colorant at each of said second illuminants the same color as said target color under said first illuminant, into which transforming means the color temperature detected by said spectralphotometer and the colorimetric values of said target color under said first illuminant are inputted, and from which transforming means the color separation values of said reproduced color under the observational illuminant are outputted into a color output device.

2. A color matching apparatus according to claim 1, wherein the colorimetric values are one of a set of X, Y and Z values in an XYZ colorimetric system, a set of L*, a* and b* values in an L*a*b* colorimetric system, and a set of L*, U* and v* values in an L*u*v* colorimetric system, while the color separation values are one of a set of red (R), green (G), and blue (B), a set of cyan (C), magenta (M), and yellow (Y), and a set of cyan (C), magenta (M), yellow (Y), and black (K).

3. A color matching apparatus according to claim 1, wherein said transforming means is a multilayered feedforward neural network having a learning function.

4. A color matching apparatus according to claim 1, wherein said predetermined illuminant is a standard illuminant of a D illuminant or a C illuminant having a color temperature of 4000 [K] to 20000 [K].

5. A color matching apparatus for reproducing visually the same color under different illuminants, said apparatus comprising:

a spectralphotometer for detecting the spectral distribution of an observational illuminant; and a transforming means for transforming colorimetric values of a target color under a predetermined first illuminant into color separation values for a reproduced color which under said observational illuminant visually appears the same as said target color under said first illuminant, said transforming means storing the relationship between the colorimetric values of said target color and corresponding color separation values under a plurality of second illuminants having given spectral distributions, said corresponding color separation values determined so as to visually reproduce with a colorant at each of said second illuminants the same color as said target color under said first illuminant, into which transforming means the spectral distribution detected by said spectralphotometer and the colorimetric values of said target color under said first illuminant are inputted, and from which transforming means the color separation values of said reproduced color under the observational illuminant are outputted into a color output device.

6. A color matching apparatus according to claim 5, wherein the colorimetric values are one of a set of X, Y and Z values in an XYZ colorimetric system, a set of L*, a* and b* values in an L*a*b* colorimetric system, and a set of L*, U* and v* values in an L*u*v* colorimetric system, while the color separation values are one of a set of red (R), green (G), and blue (B), a set of cyan (C), magenta (M), and yellow (Y), and a set of cyan (C), magenta (M), yellow (Y), and black (K).

7. A color matching apparatus according to claim 5, wherein said transforming means is a multilayered feedforward neural network having a learning function.

8. A color matching apparatus according to claim 5, wherein said predetermined illuminant is a standard illuminant of a D illuminant or a C illuminant having a color temperature of 4000 [K] to 20000 [K].

9. A color matching apparatus for reproducing visually the same color under different illuminants, said apparatus comprising:

a spectralphotometer for detecting colorimetric values by colorimetrically measuring a color chip illuminated by an observational illuminant; and a transforming means for transforming colorimetric values of a target color under a predetermined first illuminant into color separation values for a reproduced color which under said observational illuminant visually appears the same as said target color under said first illuminant, said transforming means storing the relationship between the colorimetric values of said target color and corresponding color separation values under a plurality of second illuminants having given colorimetric values as detected said spectralphotometer, said corresponding color separation values determined so as to visually reproduce with a colorant at each of said second illuminants the same color as said target color under said first illuminant, into which transforming means the color temperature detected by said spectralphotometer and the colorimetric values of said target color under said first illuminant are inputted, and from which transforming means the color separation values of said reproduced color under the observational illuminant are outputted into a color output device.

10. A color matching apparatus according to claim 9, wherein the colorimetric values are one of a set of X, Y and Z values in an XYZ colorimetric system, a set of L*, a* and b* values in an L*a*b* colorimetric system, and a set of L*, U* and v* values in an L*u*v* colorimetric system, while the color separation values are one of a set of red (R), green (G), and blue (B), a set of cyan (C), magenta (M), and yellow (Y), and a set of cyan (C), magenta (M), yellow (Y), and black (K).

11. A color matching apparatus according to claim 9, wherein said transforming means is a multilayered feedforward neural network having a learning function.

12. A color matching apparatus according to claim 9, wherein said predetermined illuminant is a standard illuminant of a D illuminant or a C illuminant having a color temperature of 4000 [K] to 20000 [K].

13. A method for reproducing visually with a colorant the same color under different illuminants, comprising:

(a) formulating the relationship between the colorimetric values of a target color under a first predetermined illuminant and corresponding color separation values under a plurality of second illuminants having a given spectral property, said corresponding color separation values determined so as to visually reproduce with a colorant at each of said second illuminants the same color as said target color under said first illuminant;

(b) determining said spectral property of an observational illuminant for observing a reproduction of a target color;

(c) measuring the colorimetric values of said target color under said first illuminant;

(d) transforming the colorimetric values measured in step (c) into color separation values under said observational illuminant using the relationship established in step (a) for the spectral properties determined in step (b); and (f) outputting color with said colorant in accordance with said color separation values.

14. The method according to claim 13, wherein said spectral property is color temperature.

15. The method according to claim 13, wherein said spectral property is the spectral distribution of the illuminant.

16. The method according to claim 13, wherein said spectral property is the colorimetric values of said illuminant, and wherein step (b) comprises colorimetrically measuring a color chip illuminanted by said observational illuminant.

* * * * *